(12) United States Patent
Childers

(10) Patent No.: US 9,069,141 B2
(45) Date of Patent: Jun. 30, 2015

(54) FIBER OPTIC TERMINATION ARRANGEMENT AND METHOD OF MAKING THE SAME

(71) Applicant: Brooks A. Childers, Christianburg, VA (US)

(72) Inventor: Brooks A. Childers, Christianburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 112 days.

(21) Appl. No.: 13/709,577

(22) Filed: Dec. 10, 2012

(65) Prior Publication Data

US 2014/0161400 A1 Jun. 12, 2014

(51) Int. Cl.
*G02B 6/255* (2006.01)
*G02B 6/26* (2006.01)
*G02B 6/42* (2006.01)
*G02B 6/38* (2006.01)

(52) U.S. Cl.
CPC .............. *G02B 6/3809* (2013.01); *G02B 6/255* (2013.01); *G02B 6/3801* (2013.01); *G02B 6/2558* (2013.01)

(58) Field of Classification Search
CPC ..... G02B 6/255; G02B 6/2558; G02B 6/3801
USPC ................................. 385/43, 62, 98
See application file for complete search history.

(56) References Cited

U.S. PATENT DOCUMENTS

| 6,416,235 B1 | 7/2002 | Rabinovich |
| 6,672,773 B1 * | 1/2004 | Glenn et al. ..................... 385/70 |
| 7,016,573 B2 * | 3/2006 | Dong et al. ..................... 385/46 |
| 8,081,667 B2 * | 12/2011 | Gapontsev et al. ............... 372/6 |
| 2009/0080835 A1 * | 3/2009 | Frith ............................... 385/50 |
| 2009/0304551 A1 * | 12/2009 | Mutharasan et al. ....... 422/82.11 |

OTHER PUBLICATIONS http://www.hellotrade.com/vitro-com-incorporated/fiber-optic-ferrules.html; 2 pages, Dec. 6, 2012.
http://www.photonics.com/Article.aspx?AID=13307; 2 pages, Dec. 6, 2012.

* cited by examiner

*Primary Examiner* — Ryan Lepisto
(74) *Attorney, Agent, or Firm* — Cantor Colburn LLP

(57) ABSTRACT

A fiber optic termination arrangement includes a first optical fiber with a core surrounded by cladding having, a first end having a first outer surface and a second end having a second outer surface. The second outer surface is sized to match that of a second optical fiber to facilitate splicing the second end of the first optical fiber to a third end of the second optical fiber. Additionally, the first outer surface is sized and configured to interface with a connector capable of operationally aligning the core of the first optical fiber with a core of a third optical fiber or an optical receiving/transmitting device. The first optical fiber also includes a transition region wherein a third outer surface of the first optical fiber transitions from the first outer surface to the second outer surface.

14 Claims, 2 Drawing Sheets

FIBER OPTIC TERMINATION ARRANGEMENT AND METHOD OF MAKING THE SAME

BACKGROUND

Optical fibers have terminations that are optically coupled via connector systems to other optical fibers or to an optical receiving/transmitting device. Typical fiber terminations employ a metal or ceramic ferrule that is glued to an outer radial surface of the fiber with an adhesive such as epoxy, for example. Differences in coefficients of thermal expansion between the fiber and the ferrule can cause the end of the fiber to extend beyond or be withdrawn from an end of the ferrule. Such a condition is undesirable because proper optical coupling between two fibers or between a fiber and an optical receiving/transmitting device rely upon the end of the fiber being butted thereagainst. New termination arrangements and methods of making such arrangements that overcome this undesirable condition are of interest to those who practice in the art.

BRIEF DESCRIPTION

Disclosed herein is a fiber optic termination arrangement. The arrangement includes a first optical fiber with a core surrounded by cladding having, a first end having a first outer surface and a second end having a second outer surface. The second outer surface is sized to match that of a second optical fiber to facilitate splicing the second end of the first optical fiber to a third end of the second optical fiber. Additionally, the first outer surface is sized and configured to interface with a connector capable of operationally aligning the core of the first optical fiber with a core of a third optical fiber or an optical receiving/transmitting device. The first optical fiber also includes a transition region wherein a third outer surface of the first optical fiber transitions from the first outer surface to the second outer surface.

Further disclosed herein is a fiber optic termination arrangement. The arrangement includes a first optical fiber with a core surrounded by cladding having a first end with a first outer surface and a second end with a second outer surface, the first outer surface is larger than the second outer surface, and a second optical fiber has a third end operably spliced to the second end of the first optical fiber.

Further disclosed herein is a method of making an optical fiber termination. The method includes forming a single structured first optical fiber with a core surrounded by cladding defining a first outer surface, reducing the first outer surface of the first optical fiber near one end thereof to an outer surface dimensioned approximate an outer surface dimension of a second optical fiber, and operationally fusing the one end to the second optical fiber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
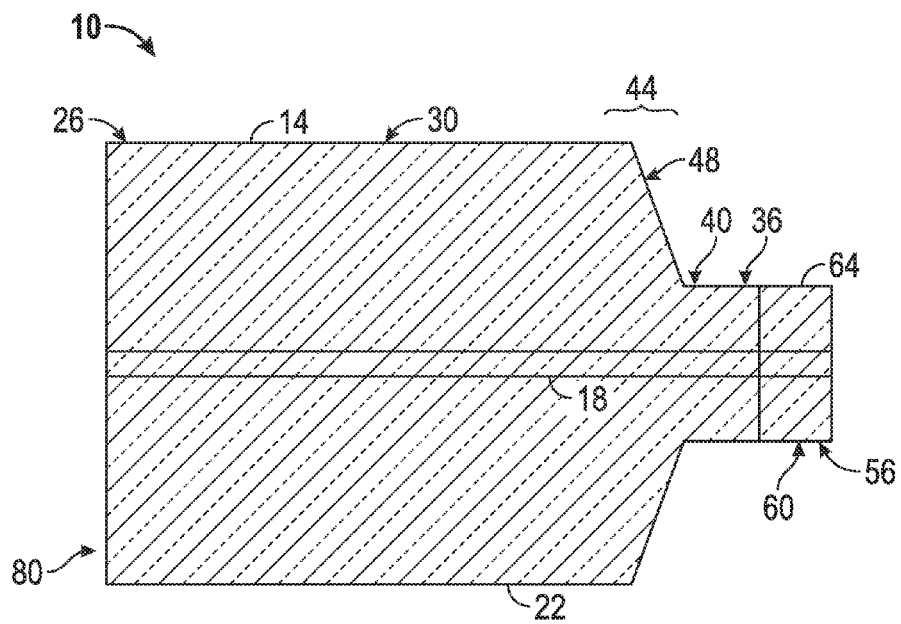
FIG. 1 depicts a cross sectional side view of a fiber optic termination arrangement disclosed herein.
Figure 2:
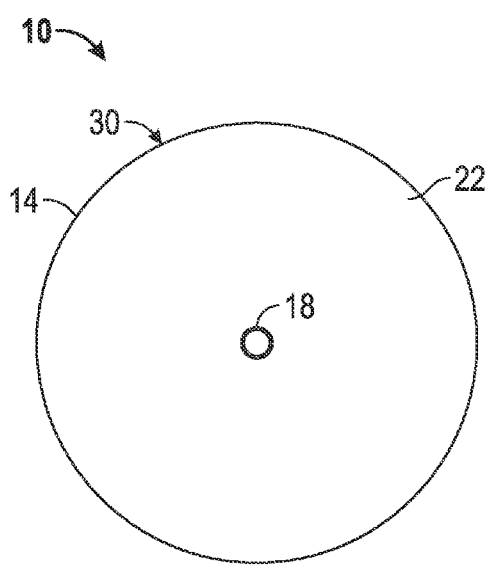
FIG. 2 depicts a cross sectional end view of the fiber optic termination arrangement of FIG. 1.
Figure 3:
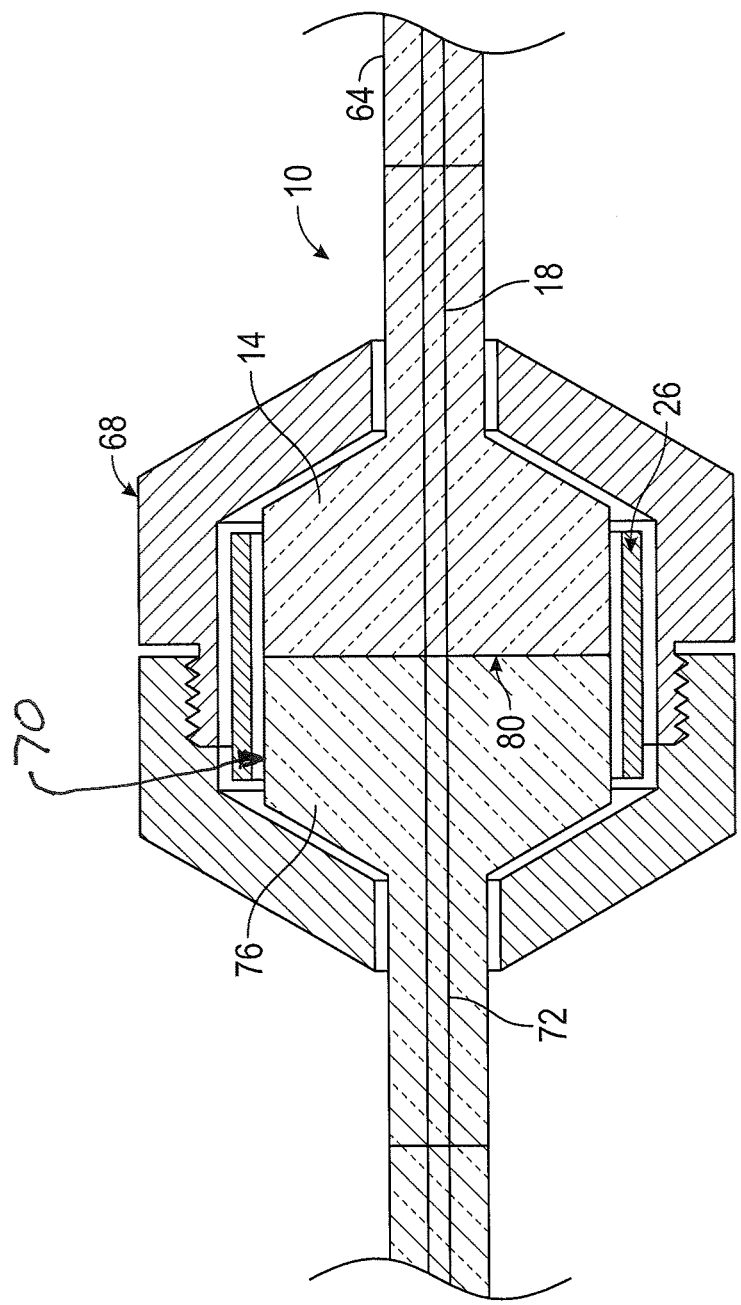
FIG. 3 depicts a cross sectional side the fiber optic termination arrangement of FIG. 1 employed in a connector system.

Referring to FIGS. 1-3, an embodiment of a fiber optic termination arrangement is illustrated at 10. The arrangement 10 includes a first optical fiber 14 with a core 18 surrounded by cladding 22. The first optic fiber 10 has a first end 26 with a first outer surface 30 and a second end 36 with a second outer surface 40, and a transition region 44 located between the first end 26 and the second end 36. An outer surface 48 of the fiber 10 in the transition region 44 varies between the two outer surfaces 30 and 40 and joins them together. In this embodiment the outer surface 48 in the transition region 44 is frustoconical, although other shapes such as smoothly curved lines that define a profile of the surface 48 are also contemplated. The second outer surface 40 is sized to match a third outer surface 56 on a third end 60 of a second optical fiber 64 to facilitate operationally splicing or fusing (usually through heating) the first optical fiber 14 to the second optical fiber 64. Additionally, the first outer surface 30 and a fourth outer surface 70 are sized and configured to interface with a connector system 68 (FIG. 3 only) capable of aligning the core 18 of the first optical fiber 14 with a core 72 of a third optical fiber 76 or an optical receiving/transmitting device (not shown) such as a repeater/amplifier, for example.

The first optical fiber 14 is formed in an operation wherein the core 18 and the cladding 22 are made as a single structure, such as from a draw tower, for example. As initially formed the first optical fiber 14 has just the larger radial dimensioned first outer surface 30 over its entire length. Secondary processes are employed to reduce the dimensions thereof down to the outer surfaces 40 and 48. These processes can include at least one of chemically etching or grinding away the cladding 22 that needs to be removed to reach the final dimensions of the outer surfaces 40 and 48. When removal of the unwanted portion of the cladding 22 is complete the first outer surface 30 will be significantly larger radially than the second outer surface 40. In fact, the first outer surface 30 can be about at least eight times larger radially than the second outer surface 40 and may be 10 to 20 times larger radially. Although other embodiments may have alternate shapes, in this embodiment the outer surfaces 30 and 40 both have cylindrical shapes.

The larger radial dimensions of the first outer surface 30 allows the first optical fiber 14 to be reliably connected and disconnected from operable engagement with the third optical fiber 76 (FIG. 3). The first end 26 includes a face 80 illustrated in this embodiment as a planar surface formed orthogonally to the core 18, although the face 80 may alternately be formed non-orthogonally to reduce back reflections. Regardless of the angle, the face 80 is continuous and seamless fully thereacross even at the boundary that defines the separation between the core 18 and the cladding 22. As such, the first optical fiber 14 avoids the possibility of a discontinuity existing across the face 80 as can happen with typical termination systems that use epoxy to adhere a separately made ferrule to, for example, the second outer surface 40. No matter how strong the epoxy adheres a ferrule to the second outer surface 40, differences in coefficients of thermal expansion between the ferrule and the second outer surface 40 can cause unwanted dimensional discontinuities at the boundary defined between the ferrule and the fiber.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fiber optic termination arrangement comprising:
a first optical fiber with a first core surrounded by cladding having;
a first end having a first cylindrical outer surface;
a second end having a second outer surface, the second outer surface being sized to match that of a second optical fiber to facilitate splicing the second end of the first optical fiber to a third end of the second optical fiber, the first cylindrical outer surface being sized and configured similar to a fourth cylindrical outer surface of a third optical fiber to interface with a connector capable of operationally aligning the first core of the first optical fiber with a second core of the third optical fiber or an optical receiving/transmitting device without splicing the first core to the second core; and
a transition region wherein a third outer surface of the first optical fiber transitions from the first cylindrical outer surface to the second outer surface.

2. The fiber optic termination arrangement of claim 1, wherein the first cylindrical outer surface is about at least eight times larger radially than that the second outer surface.

3. The fiber optic termination arrangement of claim 1, wherein the first cylindrical outer surface is about ten to twenty times larger radially than the second outer surface.

4. The fiber optic termination arrangement of claim 1, wherein the first cylindrical outer surface, the second outer surface and the outer surface of the first optical fiber in the transition region are defined by the cladding.

5. The fiber optic termination arrangement of claim 1, wherein the core and the cladding of the first optical fiber are a single continuous structure.

6. The fiber optic termination arrangement of claim 1, wherein the outer surface of the first optical fiber in the transition region is frustoconical.

7. The fiber optic termination arrangement of claim 1, wherein the first end includes a face of the core and the cladding that is substantially orthogonal to longitudinal orientation of the core.

8. The fiber optic termination arrangement of claim 1, wherein the first optical fiber can be reliably connected and disconnected from operable engagement with the third optical fiber.

9. A fiber optic termination arrangement comprising:
a first optical fiber with a first core surrounded by cladding having a first end with a first cylindrical outer surface and a second end with a second outer surface, a third outer surface connecting the first out surface to the second outer surface, the first cylindrical outer surface being larger than the second outer surface;
a second optical fiber having a third end operably spliced to the second end of the first optical fiber; and
a third optical fiber having a fourth cylindrical outer surface and a second core, the fourth cylindrical outer surface being sized similar to the first cylindrical outer surface to facilitate operationally aligning the second core with the first core without splicing the second core to the first core.

10. The fiber optic termination arrangement of claim 9, wherein the first optical fiber is a single structure.

11. A method of making an optical fiber termination, comprising:
forming a single structured first optical fiber with a first core surrounded by cladding defining a first cylindrical outer surface;
reducing an outer surface of the first optical fiber at a transition region near one end thereof from the first cylindrical outer surface to a second outer surface dimensioned approximate an outer surface dimension of a second optical fiber over a third outer surface;
operationally fusing the one end to the second optical fiber; and
sizing the first cylindrical outer surface to be similar to a fourth cylindrical outer surface of a third optical fiber to facilitate interfacing the first optical fiber and the third optical fiber with a connector capable of operationally aligning the first core with a second core of the third optical fiber without needing to splice the first core to the second core.

12. The method of making an optical fiber termination of claim 11, wherein the reducing the third outer surface is through grinding.

13. The method of making an optical fiber termination of claim 11, wherein the reducing the third outer surface is through etching.

14. The method of making an optical fiber termination of claim 11, further comprising setting an unreduced outer surface of the first optical fiber so that a separate ferrule need not be attached to the first optical fiber before operationally connecting the first optical fiber to a third optical fiber or an optical receiving/transmitting device.

* * * * *